(12) United States Patent
Gettemy et al.

(10) Patent No.: US 7,973,772 B2
(45) Date of Patent: *Jul. 5, 2011

(54) SINGLE PIECE TOP SURFACE DISPLAY LAYER AND INTEGRATED FRONT COVER FOR AN ELECTRONIC DEVICE

(75) Inventors: Shawn R. Gettemy, San Jose, CA (US); William R. Hanson, Mountain View, CA (US); Lawrence Lam, San Jose, CA (US); Anna P. Slothower, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 887 days.

This patent is subject to a terminal disclaimer.

(21) Appl. No.: 11/758,888

(22) Filed: Jun. 6, 2007

(65) Prior Publication Data

US 2007/0229475 A1 Oct. 4, 2007

Related U.S. Application Data

(63) Continuation of application No. 09/863,706, filed on May 22, 2001, now Pat. No. 7,348,964, which is a continuation-in-part of application No. 09/774,990, filed on Jan. 30, 2001.

(51) Int. Cl.
*G09G 5/00* (2006.01)

(52) U.S. Cl. ........ 345/173; 345/156; 345/169; 345/179; 345/905; 361/616; 361/625; 361/679.56

(58) Field of Classification Search .......... 345/173–183; 178/18.01–18.11; 361/616, 625, 679.3, 679.56, 361/679.6, 61

See application file for complete search history.

(56) References Cited

U.S. PATENT DOCUMENTS

| | | | | |
|---|---|---|---|---|
| 5,838,309 A | * | 11/1998 | Robsky et al. | 345/173 |
| 6,483,498 B1 | * | 11/2002 | Colgan et al. | 345/173 |
| 6,556,189 B1 | * | 4/2003 | Takahata et al. | 345/173 |
| 7,239,305 B1 | * | 7/2007 | Nakano et al. | 345/179 |
| 7,348,964 B1 | * | 3/2008 | Gettemy et al. | 345/173 |
| 2002/0149571 A1 | * | 10/2002 | Roberts | 345/174 |

* cited by examiner

*Primary Examiner* — Quan-Zhen Wang
*Assistant Examiner* — Jennifer T Nguyen
(74) *Attorney, Agent, or Firm* — Mahamedi Paradice Kreisman LLP; Van Mahamedi

(57) ABSTRACT

A single-piece top surface display and integrated front cover for an electronic device. In one embodiment, the cover comprises a thin, flexible, transparent layer coupled with a supporting structure. The flexible layer is supported above a display screen which is coupled with pressure activated sensors located under the display screen. The cover is dust-free, waterproof, and has a flat outer surface that is free of any steps or indentations. Users input data by applying pressure on the cover which causes the display screen to deflect and activate the sensors. The pressure exerted on the sensors is triangulated to register the position of the user input. In another embodiment, the cover is transparent, rigid, and directly contacts the pressure activated sensors which are located in front of the display screen or in the housing behind it. When pressure is applied to the cover, the cover deflects and activates the sensors. In both embodiments, an accelerometer identifies valid input events.

20 Claims, 6 Drawing Sheets

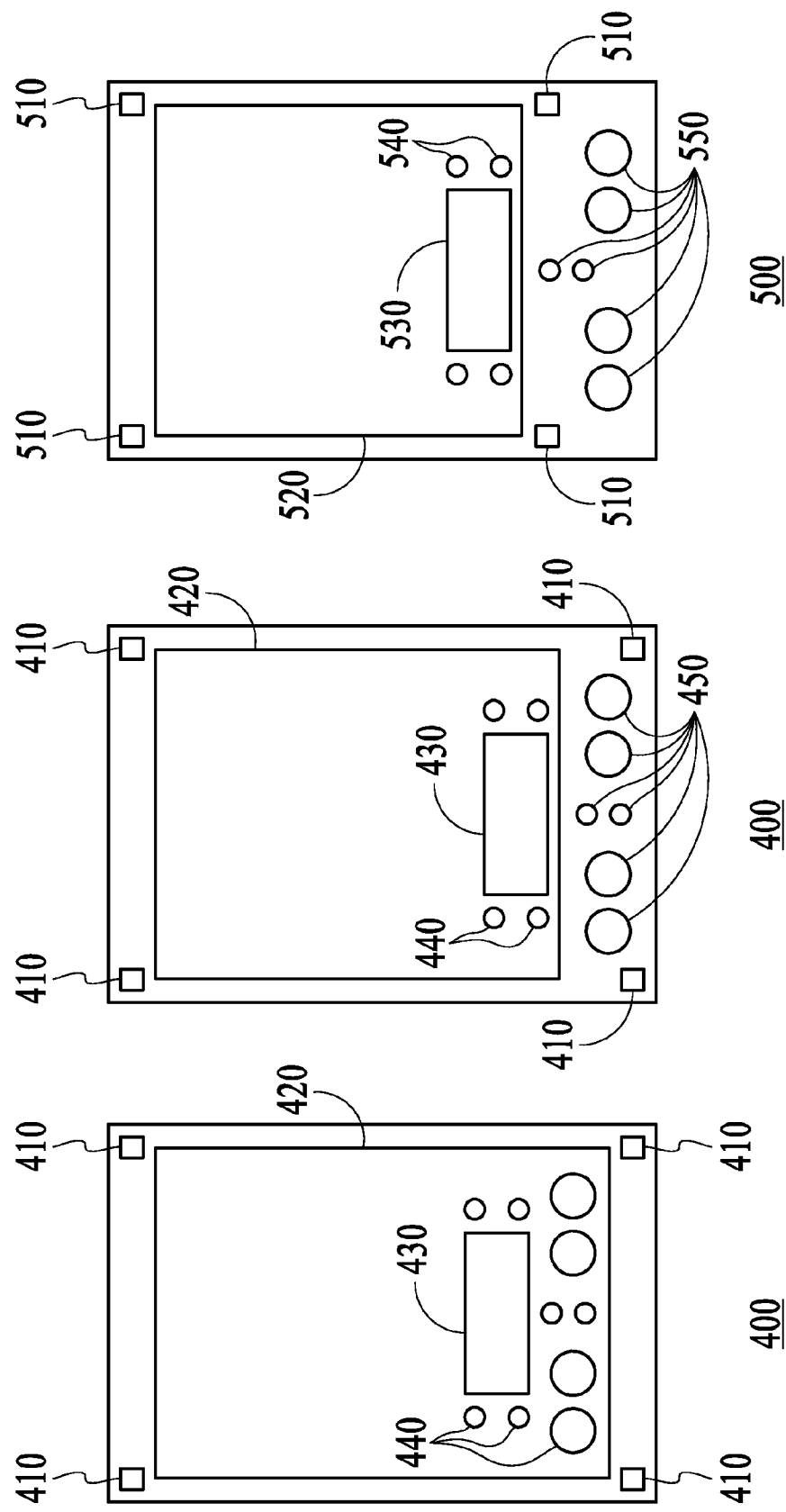

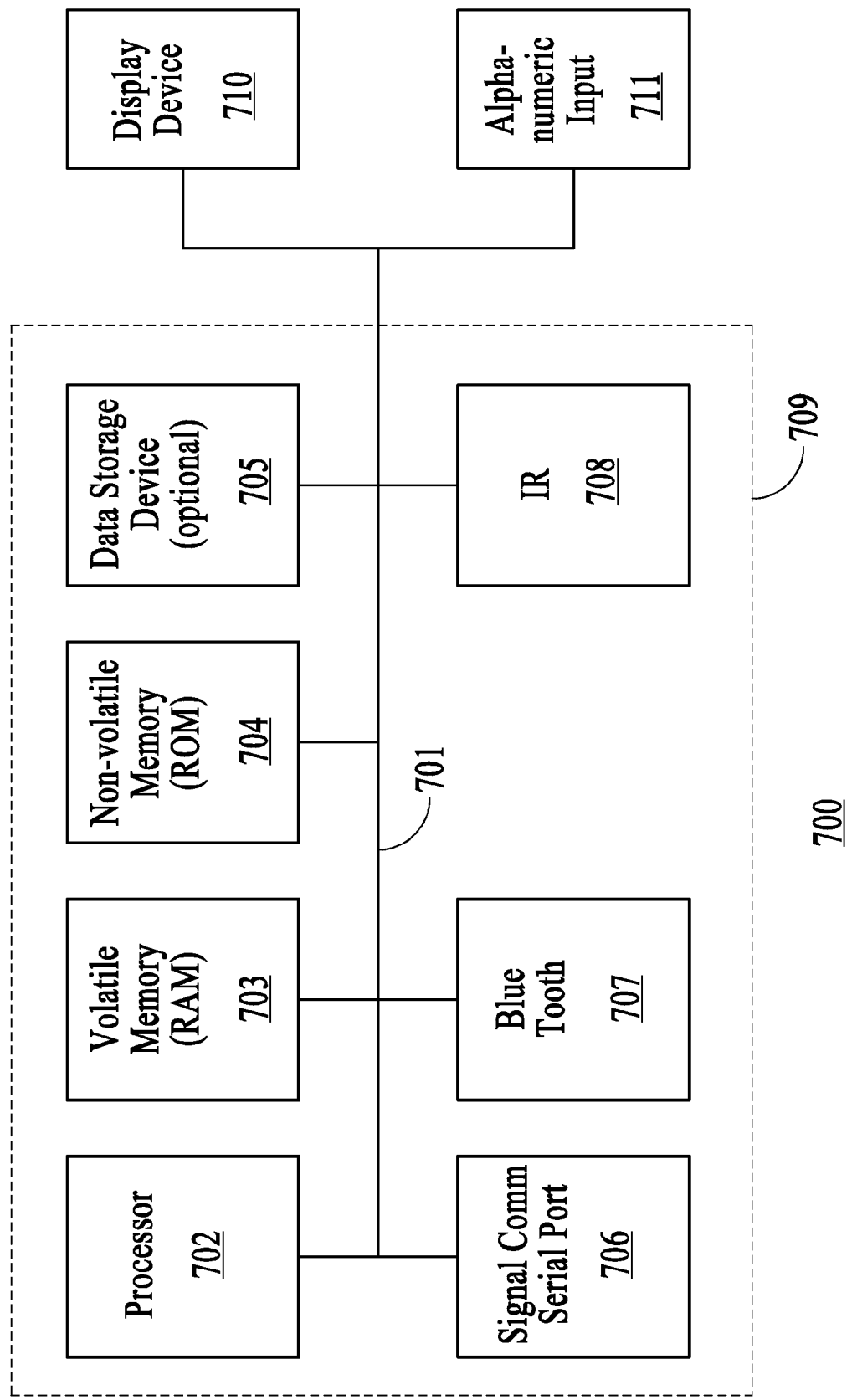

SINGLE PIECE TOP SURFACE DISPLAY LAYER AND INTEGRATED FRONT COVER FOR AN ELECTRONIC DEVICE

RELATED APPLICATIONS

This application is a continuation of U.S. patent application Ser. No. 09/863,706 filed May 22, 2001 U.S. Pat. No. 7,348,964; which is a continuation-in-part application of U.S. patent application Ser. No. 09/774,990 filed Jan. 30, 2001; both of the aforementioned priority applications are hereby incorporated by reference in their entirety.

BACKGROUND OF THE INVENTION

1. Field of the Invention

The present invention relates to the field of portable electronic devices that contain display devices. More particularly, the present invention relates to devices that contain a touch screen assembly that is activated by finger touch or by stylus pressure.

2. Prior Art

Advances in computer technology have enabled the further miniaturization of the components required to build computer systems. As such, new categories of computer systems have been created. One of the newer categories of computer systems is the portable, hand held, or "palmtop" computer system, also referred to as a personal digital assistant or PDA. Other examples of a portable computer system include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

Flat panel resistive touch screen displays are found in numerous electronic products such as wrist watches, hand calculators, cell phones and PDA's both to present information to the user as well as to facilitate input of data such as user touch screen commands. Such displays include a resistive digitizer mechanism and a display mechanism. A typical resistive digitizer mechanism consists of a digitizing element having a flexible thin film supported slightly above the surface of another thin layer digitizing element. A pressure applied to the outer surface of the flexible film causes the film to deflect and contact the digitizing element at a point which can be measured and thereby used as an input signal to activate the digitizer mechanism.

The flexible film and the digitizing element must be mounted in a support housing to provide and maintain the proper spacing between the two. At the same time, additional protection against moisture, dust, and mechanical damage must be provided for the flexible film used in the digitizer mechanism. Thus, an additional outer protective film mounted above the digitizer flexible film is generally included in the touch screen display assembly. The problem here is the reduction in the sensitivity to the external mechanical pressure required to activate the digitizer mechanism. In addition, the added protective film may increase overall opacity which makes it more difficult to view any display element housed within.

Typically, a touch screen mechanism and a display mechanism are mounted within an enclosure in a recessed fashion. That is, the surface of the additional protective film which actually forms the outer surface of the digitizer mechanism is on a level below the outer edges of the supporting enclosure which acts as a bezel. The display is mounted beneath this digitizer mechanism. The resulting product then has a rim or step-down edge surrounding the touch screen which presents the typical bezel-like appearance.

FIG. 1 is a cross-section view of an enclosure/touch screen assembly 100 utilized in prior art. The entire assembly is held in place by the supporting structure 105. The outer protective film 110 provides mechanical protection for the resistive digitizer film 120. In addition, the outer protective film is coupled to the support mechanism in order to provide a moisture and dust seal. The digitizing element 130 is located below and close to the digitizer film 120. An externally applied pressure that deflects the protective film will also deflect the digitizer film.

Any applied pressure great enough to cause the digitizer film to contact the digitizing element will then activate the resistive digitizer mechanism. The display element 140 is located below the digitizer mechanism. User information is displayed on the upper surface of the display element. Together, the protective film, the digitizer film and the digitizing element must have an opacity small enough to allow viewing of the information displayed on the display element. The entire touch screen assembly is located within the support structure such that the surface of the outer protective film is below the upper edge of the support structure. There is therefore a step-down corner 150 from the upper edge of the support structure to the surface of the outer protective film and the resulting assembly exhibits a bezel like appearance. These step-down corners add thickness to the assembly, are dust and moisture collectors, are difficult to clean, and frequently do not seal properly. The electrical traces and electrodes 160, locate where the digitizer film and the digitizing element come into contact with each other. The metal frame 170, physically separates the touch screen assembly from the display element.

One problem with the bezel design is that maintaining a moisture and dust-free environment for the touch screen mechanism is difficult. Such an assembly often does not provide a satisfactory moisture and dust proof enclosure. An additional problem involves the complexity and cost of assembly. Yet another problem involves the overall thickness of the device. The bezel design adds unwanted thickness to the display components. Additionally, some designers would like to eliminate the bezel to update the appearance of the device.

Another drawback is that, because of the amount of space between the touch surface of the touch screen and display screen, there is what is commonly referred to as the parallax effect. Simply stated, the parallax effect is a type of visual spatial distortion such that the actual point of contact on the touch screen does not correspond to the intended target area of the display screen. This is analogous to a stick being immersed in water, such that the stick takes on a bent or distorted appearance.

An additional drawback is that the amount of light that comes from the display screen through the touch screen to be viewed by the user is only about 80% of the available light. In a reflective display, that amount is further reduced to about 64%. This reduces the overall contrast, clarity, and quality of the display as seen by the user.

SUMMARY OF THE INVENTION

It would be advantageous, then, to provide a flat bezel-free display interface. Such an interface would reduce the possibility of damage to electronic components from dust or water. It would also be advantageous to provide a display interface which reduces the parallax effect and passes more light from the display to the viewer The present invention provides a solution to meet the above needs.

Accordingly, embodiments of the present invention solve the problems of parallax and reduced display quality seen in today's touch screen displays. Embodiments of the present invention also eliminate the need for the bezel usually seen with touch screen displays The optical properties of the display are improved because the layers required for the conventional analog resistive touch screens are eliminated. Embodiments of the present invention enable thinner construction. They improve the optical performance of the display including power efficiency, contrast, and brightness. These and other advantages of the present invention and others not specifically recited above will be described in more detail herein.

Embodiments of the present invention include a single-piece integrated front cover and display for an electronic device. In one embodiment, the cover consists of a thin flexible transparent outer layer coupled with a supporting structure. The flexible layer is supported above a display screen which is coupled with pressure activated sensors located behind the display. The single-piece cover is dust-free, waterproof, and can have a flat outer surface that is bezel-free, e.g., it is free of any steps or indentations. Users input data by applying pressure on the cover which causes the display screen to deflect and activate pressure sensors. The pressure exerted on each sensor is measured to triangulate the position of the user input.

In another embodiment, the cover is transparent, rigid, and extends around the display to directly contact the pressure activated sensors. The sensors may be located in front of the display, behind it, or may be located in the housing. The display is coupled with the cover. When pressure is applied to the cover, the cover deflects and activates the sensors in both embodiments, an accelerometer can be used for thresholding to identify valid input events. This display minimizes the problems of parallax and reduced display brightness because the display is seen without the intervening layer of the touch screen mechanism.

Embodiments of the present invention describe a display assembly for an electronic device. The display assembly has a transparent cover above a display mechanism. Users can input data and commands by pressing on this cover. The forces from the user inputs are mechanically transmitted to pressure activated sensors. The sensors act in concert with an accelerometer to locate the position of valid input events and translate them into commands. In one embodiment of the present invention, the cover is a thin flexible outer film co-molded to a supporting structure. When the user presses on the cover, the display mechanism is deflected and the force is transmitted to the sensors. In another embodiment, the cover is rigid and in direct contact with the sensors. When the user presses on the cover, the force is directly transmitted to the sensors.

BRIEF DESCRIPTION OF THE DRAWINGS

FIGS. 4A and 4B show possible placements of pressure activated sensors relative to the display of a Personal Digital Assistant in accordance with one embodiment of the present invention.

FIG. 5 shows the possible placement of pressure activated sensors relative to the display of a Personal Digital Assistant in accordance with an embodiment of the present invention.

FIG. 7 illustrates an exemplary computer system upon which embodiments of the present invention may be practiced.

DETAILED DESCRIPTION

A single-piece top surface display and integrated front cover for an electronic device is described. While numerous details are set forth in order to provide a thorough understanding of the present invention, it should be understood that it is not intended to limit the invention to this particular embodiment alone. On the contrary, the invention is intended to cover alternatives, modifications and equivalents, which may be included within the spirit and scope of the invention as defined by the appended claims. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
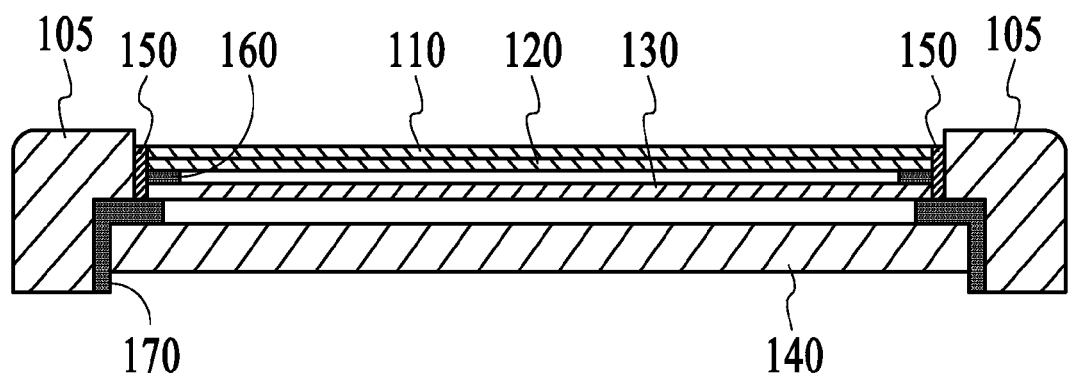
FIG. 1 is a cross-section of an enclosure/touch screen assembly utilized in prior art.
Figure 2A:
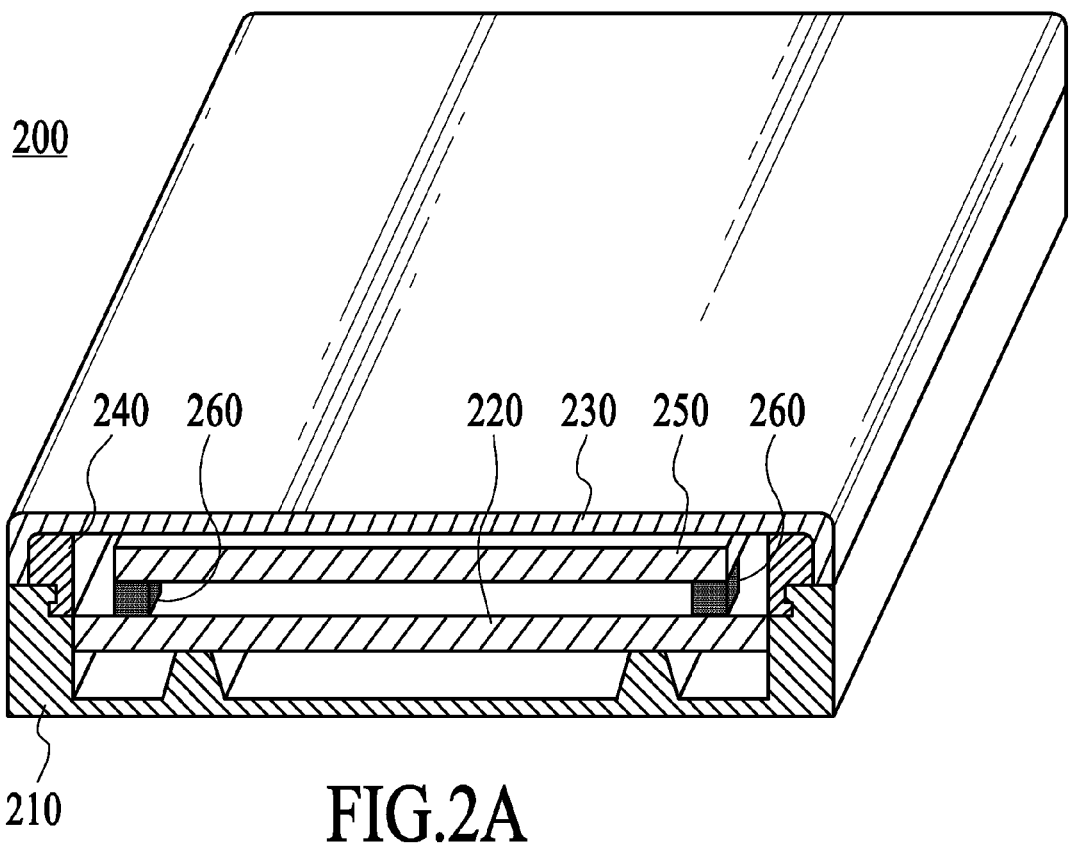
FIG. 2A is a cross-section of an electronic device which utilizes a single-piece integrated front cover and display in accordance with one embodiment of the present invention.

FIG. 2A is a cross-section of an electronic device 200 which utilizes a single-piece integrated front cover and display in accordance with one embodiment of the present invention. A back cover assembly 210 encloses and supports a circuit board 220. In the present embodiment of the invention, the back cover assembly is a rigid molded plastic such as PC, PCABS, or ABS which will support and protect the internal electronics as well as provide protection from dust, shock, and water. It is appreciated that there may be multiple circuit boards and that these circuit boards may be arrayed one above the other.

Outer film 230 is a single piece of bezel-less transparent flexible thermoplastic that covers the entire top surface of a device such as a Personal Digital Assistant. Numerous types of plastic exist which are suited for this purpose, one of which may be a PET type plastic. In the present embodiment of the invention, outer film 230 is a flat surface free of any indentations. However, in another embodiment, outer film 230 may have holes or indentations in some portion of the surface for buttons or to indicate button or other like functions. Outer film 230 is flexible in that it has sufficient deflection that a user applying force on the surface of outer film 230 will be able to apply mechanical pressure translated upon display mechanism 250. Outer film 230 is stretched over supporting structure 240.

Supporting structure 240 is, in the present embodiment of the invention, a rigid molded plastic such as PC, PCABS, or ABS and forms a perimeter frame around the top of the electrical device. Supporting structure 240 may be co-molded with outer film 230 to form a single-piece front cover assembly which may form the top surface of the device. Supporting structure 240 will also provide some method of securely attaching the front cover assembly to back cover assembly 210, thus forming a dust-proof and waterproof enclosure for the internal components of electronic device 200.

Electronic device 200 further includes a flat display mechanism 250 which is disposed between outer film 230 and above sensors 260. User display information is displayed on the top of display mechanism 250. Display mechanism 250 may be a liquid crystal display, E-ink, organic light emitting diode, field emission display, or other suitable technology used to create graphic images and alpha-numeric characters recognizable to a user. While display mechanism 250 is shown as being in contact with sensor 260 in FIG. 2, it may simply be in close enough proximity that pressure applied to outer film 230 will cause it to contact sensors 260. Sensors 260 are pressure activated sensors which, in concert with other pressure activated sensors, will be able to register the position where force is applied to display mechanism 250. In this sense, sensors 260 are placed around the periphery of the display 250 Sensors 260 are fixed to circuit board 220 which is in turn fixed to back cover assembly 210.

In one embodiment, the user will apply pressure to outer film 230 to indicate a particular position on display mechanism 250 that will input a command to device 200. The pressure sensors 260 beneath display mechanism 250 will be able to register where that position is by measuring the force exerted upon each sensor. At least three sensors may be used, and a method such as triangulation will compare the relative forces exerted and register where on display device 250 the pressure is exerted. An accelerometer (not shown) is coupled with the sensors to provide pressure thresholding to differentiate a valid input from invalid inputs that may result from, for example, dropping the device or casual contact.

Figure 2B:
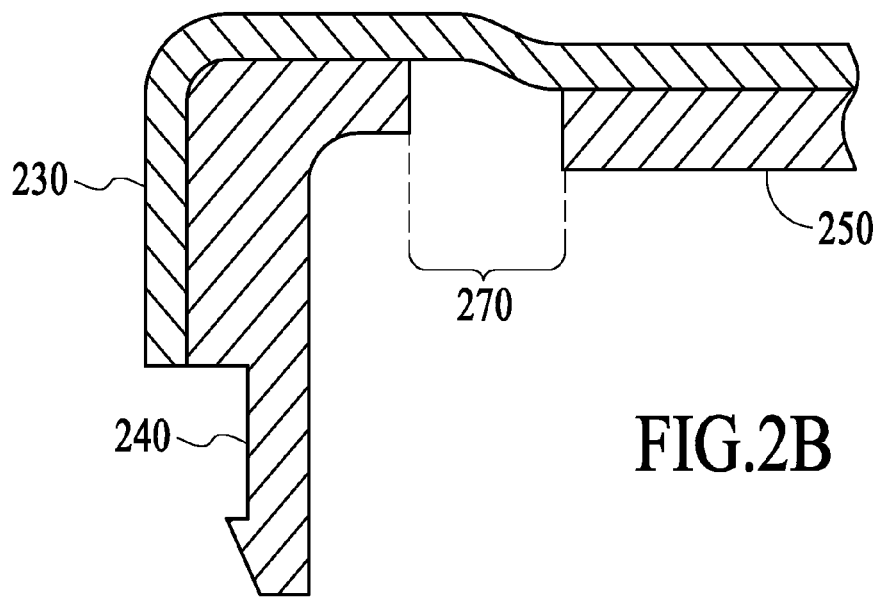
FIG. 2B is a cross-section showing details of a thin flexible cover coupled with a supporting structure in accordance with one embodiment of the present invention.

FIG. 2B is a cross section, showing in greater detail, the single-piece front cover assembly of device 200. Outer film 230 is shown with supporting structure 240 to form a single-piece front cover and display for device 200. Between the edge of supporting structure 240 and display mechanism 250 is a small gap 270. This gap allows sufficient space so that outer film 230 can come into contact with every part of the surface of display mechanism 250. If display mechanism 250 directly abutted supporting structure 240, there would be a small portion of the display that the user could not use as outer film 230 would not be able to come into contact with it. The gap may contain the traces and electrodes that connect with display mechanism 250 and be covered with a decorative border of some sort, e.g. in-mold decoration, to indicate where on device 200 the user should apply pressure.

Figure 3:
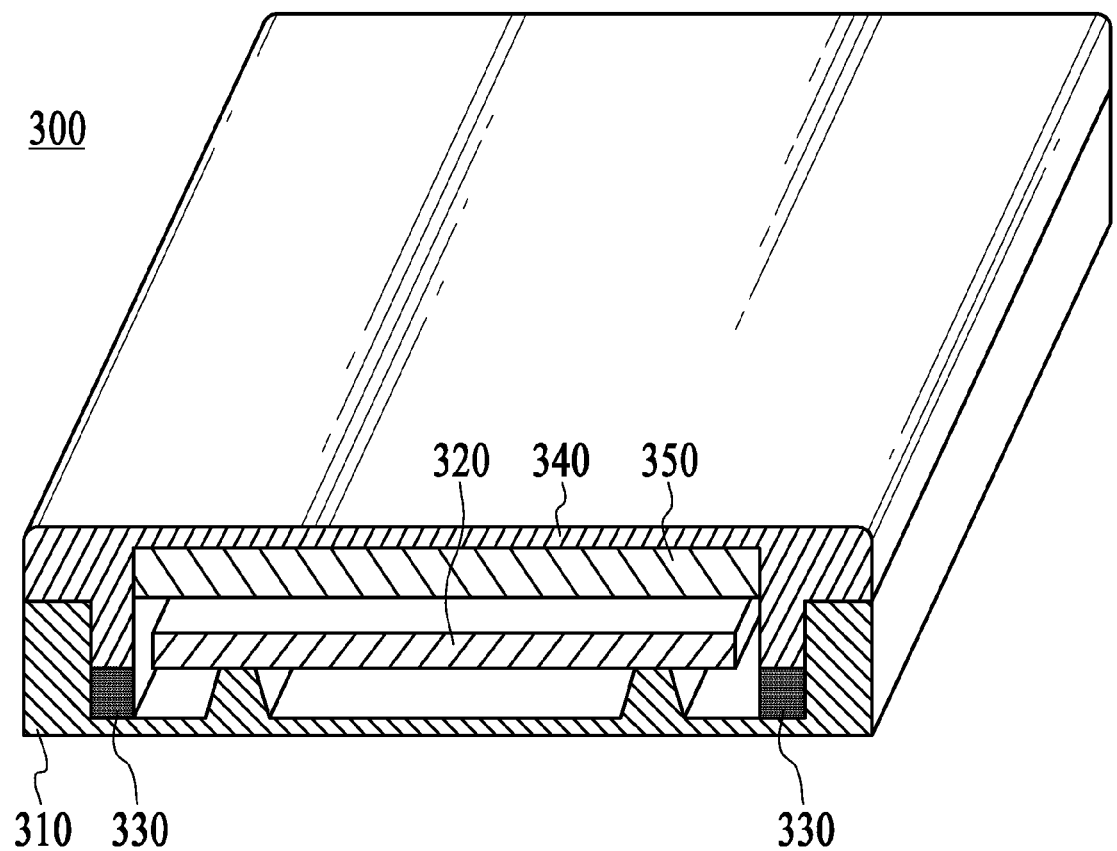
FIG. 3 is a cross-section of an electronic device which utilizes a single-piece integrated front cover and display upon which embodiments of the present invention may be based.

FIG. 3 is a cross-section of an electronic device 300 which utilizes a single-piece integrated front cover and display in accordance with another embodiment of the present invention. A back cover assembly 310 encloses and supports a circuit board 320. In the present embodiment of the invention, the back cover assembly 310 is a rigid molded plastic such as PC, PCABS, or ABS which will support and protect the internal electronics as well as provide protection from dust, shock, and water. Again, it is appreciated that there may be multiple circuit boards and that these circuit boards may be arrayed one above the other.

Device 300 is further comprised of pressure sensors 330. These are pressure activated sensors which are able to measure a force applied to them. Front cover assembly 340 is shown in contact with pressure sensor 330. Front cover assembly 340 is made of a transparent rigid plastic that forms a single-piece top cover for device 300. It is formed to translate around display device 350 to contact pressure sensor 330. Front cover assembly 340 is attached to back cover 310 to form a dust-proof, waterproof, and shock resistant enclosure for the internal components of device 300. While front cover assembly 340 is securely attached to back cover 310, it has sufficient range of motion to allow mechanical transfer to pressure sensor 330. In this embodiment of the invention, front cover assembly 340 is a single flat surface free of any indentations, however, in another embodiment the front cover assembly may have holes or indentations for buttons or to indicate button or other like functions.

The user will apply pressure to front cover assembly 340 to indicate a particular position on display mechanism 350 that will input a command to device 300. The pressure sensor beneath 330 will be able to register where that position is by measuring the force exerted upon each sensor. At least three sensors may be used and a method such as triangulation will compare the relative forces exerted and register where on display device 350 the user is inputting a command. An accelerometer (not shown) is coupled with the sensors to provide pressure thresholding to differentiate a valid input from invalid inputs that may result from, for example, dropping the device or casual contact.

FIGS. 4A and 4B show possible placements of pressure activated sensors relative to the display of a Personal Digital Assistant 400 in accordance with one embodiment of the present invention. PDA 400 may be comprised of sensors 410, display area 420, display menu 430, and display buttons 440. Additionally, FIG. 4B which illustrates another embodiment of the present invention in which indentations 450 are present. It should be noted that the sensors (410) are in both cases located beneath the front cover assembly.

In FIG. 4A, the sensors are placed in the outermost corners of the device. Display area 420 extends across the top surface of the device; display menu 430 and display buttons 440 are software generated features of display area 420 which is demarked by a visual line, not a bezel edge. Pressing on a software generated button will apply pressure to the display mechanism (display mechanism, FIG. 2) which will in turn transmit that pressure to the sensors. The pressure exerted on each of the sensors is compared and the command that the user is indicating is triangulated. In FIG. 4B, the display mechanism does not extend across the entire top surface of the device. Indentations 450 are indentations in the one piece cover which indicate button functions to the user. Pressing on the indentation will activate the pressure sensors as previously described.

FIG. 5 shows the possible placement of pressure activated sensors relative to the display of a Personal Digital Assistant 500 in accordance with another embodiment of the present invention. PDA 500 is comprised of sensors 510, display area 520, display menu 530, display buttons 540, and buttons 550. Display menu 530 and display buttons 540 are software generated features of display area 520. Again, the sensors are located beneath the front cover assembly. Buttons 550 are buttons that extend through holes in the one-piece cover assembly that will enable functions of the PDA but do not activate the sensors.

Figure 6A:
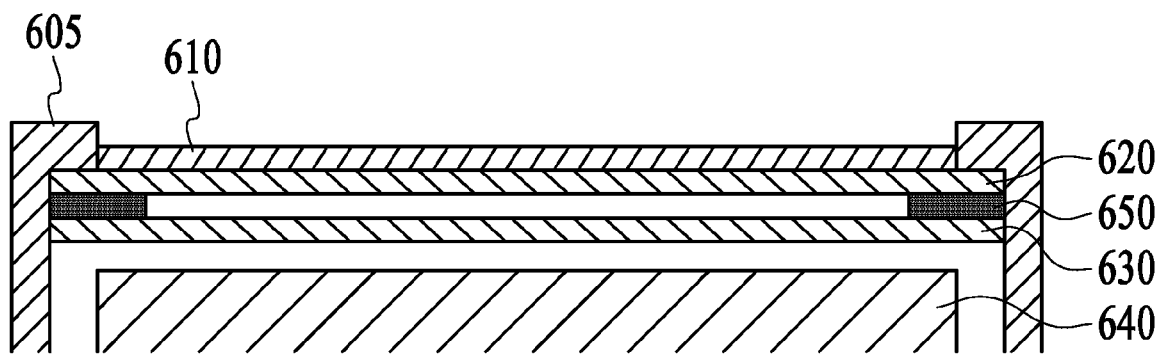
FIGS. 6A AND 6B show cross sections of a hand held computer and embodiments of the present invention illustrating where in mold decoration may be placed in the present invention.
Figure 6B:
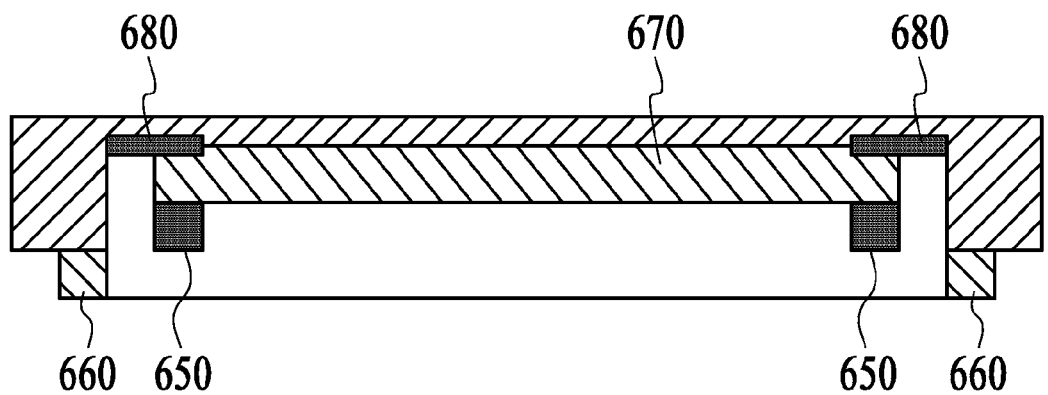

FIGS. 6A and 6B are cross sections of an exemplary hand held computer and embodiments of the present invention showing where in mold decoration may be placed in the present invention. FIG. 6A, illustrates an exemplary hand held computer which uses a resistive touch screen assembly and a display mechanism. The entire assembly is held in place by the supporting structure 605. The outer protective film 610 provides mechanical protection for the resistive touch screen assembly which is located above the display element 640. The touch screen assembly is comprised of resistive digitizer film 620, digitizer element 630, and electrical traces 650 An externally applied pressure that deflects protective film 610 will also deflect digitizer film 620. Any applied pressure great enough to cause digitizer film 620 to contact digitizing element 630 will then activate the resistive digitizer mechanism. The electrical traces 650 register the user input as a set of X/Y coordinates.

Currently, the resistive element used with touch screen displays is Indium Tin Oxide (ITO). ITO is a relatively brittle material which, overtime, will break down. It is especially likely to fail at the point where it is joined with the electrical traces 650. Because of this, digitizing element 630 is made rigid to prevent excessive flexing. It also necessitates that the touch screen assembly be as flat as possible which precludes the insertion of any in-mold decoration between the display mechanism 640 and the digitizer mechanism.

In the present invention, the touch screen assembly is eliminate because user input is detected by the pressure activated sensors. In FIG. 6B, sensors 650 indicate the position of pressure activated sensors in an embodiment of the present invention in which a bezel-less, transparent, flexible thermoplastic is stretched over a supporting structure. Sensors 660 show the placement of pressure activated sensors in an embodiment of the present invention in which the cover is a bezel-less, transparent, rigid, molded plastic. Decoration 680 is an in-mold decoration that may be placed between the top cover and the display mechanism 670. Such placement is made possible because the weaknesses inherent with the touch screen design are avoided in the present invention.

FIG. 7 illustrates exemplary circuitry of portable computer system 700. Computer system 700 includes an address/data bus 701 for communicating information, a central processor 702 coupled with the bus 701 for processing information and instructions, a volatile memory 703 (e.g., random access memory RAM) coupled with the bus 701 for storing information and instructions for the central processor 702 and a non-volatile memory 704 (e.g., read only memory ROM) coupled with the bus 701 for storing static information and instructions for the central processor 702. Computer system 700 also includes an optional data storage device 705 (e.g., thin profile removable memory) coupled with the bus 701 for storing information and instructions. Device 705 can be removable.

As described above, system 700 also contains a signal communication device 706, also coupled to bus 701. Signal communication device 706 can be a serial port (or USB port) for communicating with a cradle (not shown). In addition to device 706, wireless communication links can be established between the device 700 and a host computer system (or another portable computer system) using a Bluetooth wireless device 707 or an infrared device 708. These devices are housed on a circuit board 709 which is contained within a cover assembly.

Also included in computer system 700 of FIG. 7 is a display device 710. Display device 710 may be a liquid crystal display, field emission device (FED, also called flat panel CRT), organic light emitting diode (OLED), E-ink, or any other display device suitable for creating graphic images and alphanumeric characters recognizable to the user. In one embodiment, the display 710 is a flat panel multi-mode display capable of both monochrome and color display modes.

Device 700 also includes an alphanumeric input device 711 coupled with bus 701. In the present invention, the input device 711 comprises a plurality of pressure activated sensors and an accelerometer. Device 711 can communicate information (spatial data and pressure data) and command selections to the central processor 702. Device 711 is capable of registering a position on the screen 710 where contact is made and the pressure of the contact.

The preferred embodiment of the present invention, a single-piece top surface display for a hand held computer, is thus described. While the present invention has been described in particular embodiments, it should be appreciated that the present invention should not be construed as limited by such embodiments, but rather construed according to the below claims.

What is claimed is:

1. A display assembly for an electronic device comprising:
a display mechanism having side edges;
a plurality of sensors; and
a housing comprising:
  a back plate, and
  a single-piece bezel-less top cover having a top surface and curved edges formed to wrap over the side edges of the display mechanism, the top cover edges engaging the back cover, the housing enclosing the display mechanism to allow contact transfer between said top cover and the plurality of sensors, wherein the plurality of sensors can be activated by contact pressure applied to the top surface of the single-piece bezel-less top cover.

2. The display assembly of claim 1, wherein the display mechanism is disposed beneath the single-piece bezel-less top cover, and above the plurality of sensors.

3. The display assembly of claim 1, wherein the display mechanism directly contacts the plurality of sensors.

4. The display assembly of claim 1 wherein the plurality of sensors comprise a plurality of pressure activated sensors.

5. The display assembly of claim 4, further comprising a fixed electronic circuit layer, and wherein the plurality of pressure activated sensors are disposed between the circuit layer and the display mechanism.

6. The display assembly of claim 5, wherein the single-piece bezel-less top cover further comprises:
a transparent flexible thermoplastic outer film; and
a supporting structure that is co-molded to the transparent flexible thermoplastic outer film.

7. The display assembly of claim 6, wherein the transparent flexible thermoplastic outer film has sufficient deflection under external pressure to apply mechanical pressure to the display mechanism which applies pressure to the plurality of pressure activated sensors.

8. The display assembly of claim 6, wherein the plurality of pressure activated sensors are operable to register a position where contact is made with the transparent flexible thermoplastic outer film.

9. The display assembly of claim 1, wherein the single-piece bezel-less top cover includes a flat top surface free of any indentation.

10. The display assembly of claim 1, wherein the plurality of sensors comprise an accelerometer operable to identify the parameters of a valid input event.

11. The display assembly of claim 1, wherein the single-piece bezel-less top cover is a transparent rigid cover.

12. The display assembly of claim 11, wherein the single-piece bezel-less top cover is disposed around the display mechanism to contact the plurality of sensors, the sensors comprising a plurality of pressure activated sensors disposed between the top cover and the back cover.

13. The display assembly of claim 12, wherein the single-piece bezel-less top cover has sufficient range of motion to allow mechanical transfer between the top cover and the plurality of pressure activated sensors.

14. The display assembly of claim 12, wherein the plurality of pressure activated sensors are operable to register a position where contact is made with the single-piece bezel-less top cover.

15. The display assembly of claim 12, wherein the single-piece bezel-less top cover includes a flat top surface free of any indentation.

16. The display assembly of claim 12, wherein the single-piece bezel-less top cover has indentations to indicate button functions.

17. A display assembly for an electronic device comprising:
   a display mechanism of flat panel display technology, the display mechanism having a top surface and side edges;
   a supporting structure; and
   a transparent single-piece cover disposed over the top surface of the display mechanism and comprising a flexible thermoplastic outer film co-molded to the supporting structure, the transparent single piece cover having curved edges formed to wrap over the side edges of the display mechanism, the cover operable to allow contact transfer of pressure to the display mechanism; and a plurality of sensors disposed under the display mechanism and, responsive to the contact transfer of the display mechanism, operable for registering a contact point on the transparent single-piece cover.

18. The display assembly of claim 17, wherein the flexible thermoplastic outer film has sufficient deflection under external pressure to transfer pressure to the display mechanism.

19. The display assembly of claim 17, wherein the single-piece cover is a flat surface free of any indentations.

20. The display assembly of claim 17, wherein the plurality of sensors comprise an accelerometer operable to perform thresholding to identify a valid input event.

* * * * *